United States Patent [19]

Shirahata

[11] 4,401,996
[45] Aug. 30, 1983

[54] APPARATUS FOR RECORDING-PEN INTERCHANGE

[75] Inventor: Atsushi Shirahata, Tokyo, Japan

[73] Assignee: Watanabe Sokki Kabushiki Kaisha, Tokyo, Japan

[21] Appl. No.: 242,432

[22] Filed: Mar. 11, 1981

[30] Foreign Application Priority Data

Sep. 1, 1980 [JP] Japan .............................. 55-119813

[51] Int. Cl.³ ........................................... G01D 15/16
[52] U.S. Cl. ................................ 346/139 R; 364/520
[58] Field of Search .......................... 346/139 R, 146; 364/520

[56] References Cited

U.S. PATENT DOCUMENTS 2,674,513 4/1954 Bowditch et al. ..................... 346/46
4,135,245 1/1979 Kemplin et al. ..................... 364/520

Primary Examiner—Stafford D. Schreyer
Attorney, Agent, or Firm—Spensley, Horn, Jubas & Lubitz

[57] ABSTRACT

An automatic recording instrument has an array of store-pen-holders. To each store-pen-holder, a recording pen is assigned and is held when the pen is not in use. A moving pen-holder with a recording-pen, is computer-controlled to draw a desired trace on a recording-paper by the pen. In order to transfer a recording-pen from a store-pen-holder to the moving pen-holder, the latter comes to the position of the store-pen-holder from a first direction in which the moving pen-holder has an opening to admit the path of the recording-pen, holds the recording-pen by a magnetic clutch, and then recedes in a second direction in which the store-pen-holder has an opening to admit the path of the recording-pen. After the assigned pen is taken by the moving pen-holder, the store-pen-holder remains empty. In order to return the pen to this empty store-pen-holder, the moving pen-holder comes to the store-pen-holder from the second direction, releases the pen to the store-pen-holder, and recedes in the first direction.

16 Claims, 11 Drawing Figures

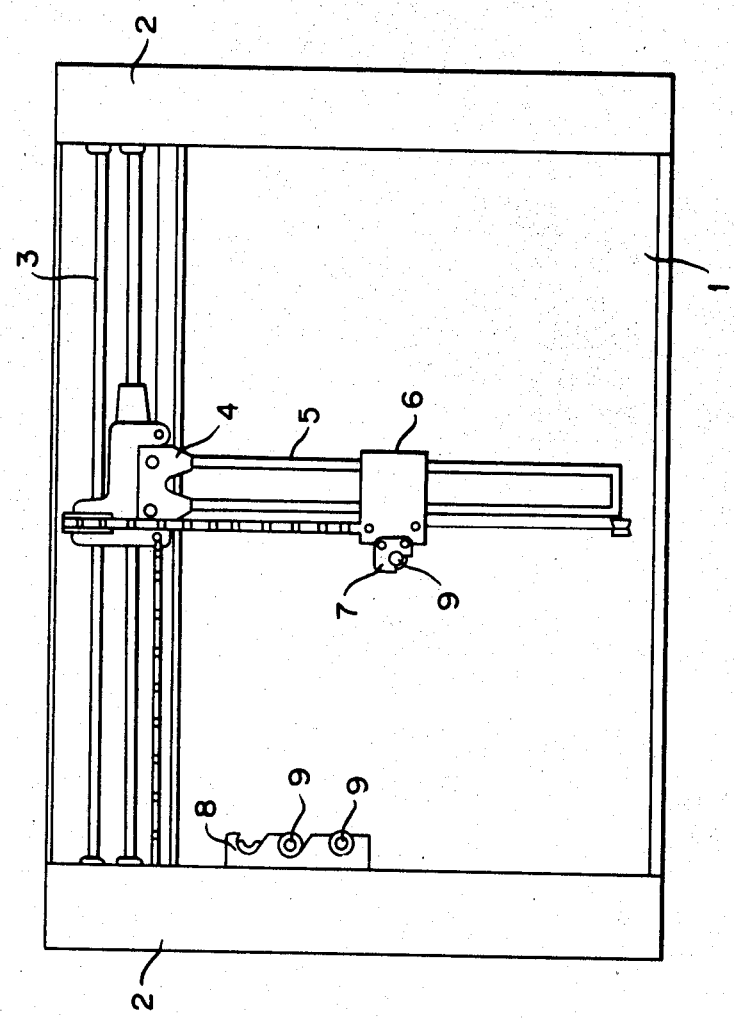

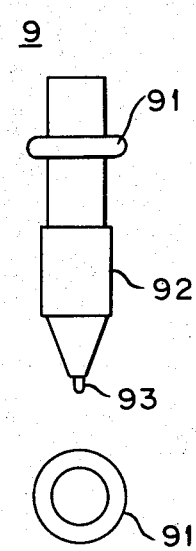
FIG. 2a
FIG. 2b
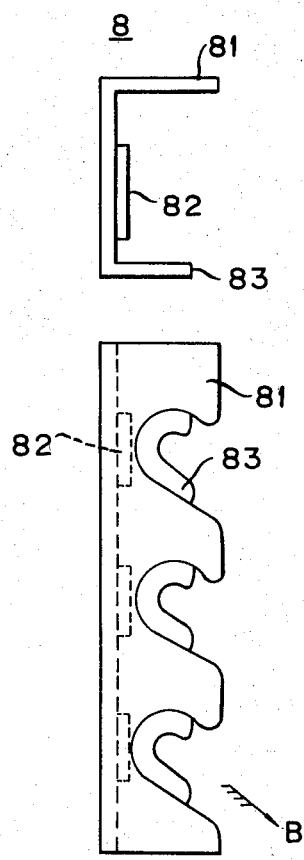
FIG. 3a
FIG. 3b

FIG.4a
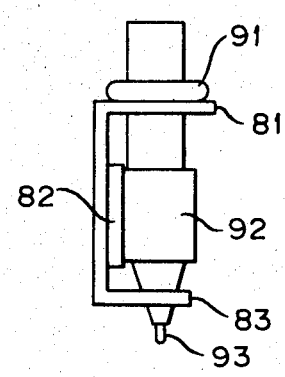
FIG.5a
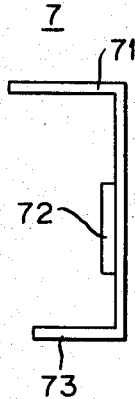
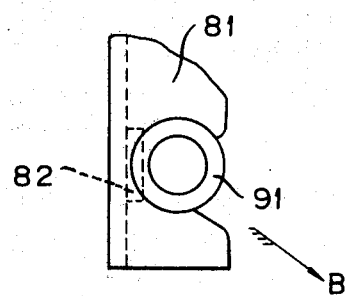
FIG.4b
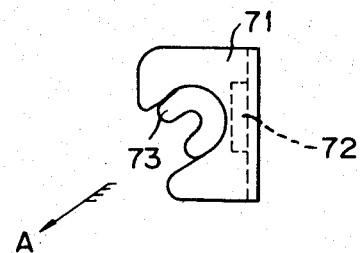
FIG.5b

APPARATUS FOR RECORDING-PEN INTERCHANGE

BACKGROUND OF THE INVENTION

This invention relates to an automatic recording instrument, and more particularly to an apparatus for recording-pen interchange.

In an automatic recording instrument, a movable carriage is provided which can be moved to a desired position in a plane parallel to the surface of the recording paper. A moving pen-holder which is mounted on the carriage, holds a recording-pen. The position of the carriage is computer-controlled to draw a desired trace on the recording-paper by the recording-pen held by the moving pen-holder. The recording instrument has several different recording-pens, and each pen is placed in an assigned store-pen-holder when the pen is not in use. Therefore, there is provided an apparatus for recording-pen interchange to transfer a designated pen between the moving pen-holder and the assigned store-pen-holder.

There have been two main groups in heretofore known apparatus for recording-pen interchange. In the first group, a designated store-pen-holder is moved to a predetermined position where recording-pen interchange is performed. For this purpose, driving means for store-pen-holders and a program for controlling the driving means must be provided in addition to the driving means for the carriage and the control program thereof, resulting in a complex apparatus.

In the second group, store-pen-holders remain fixed and the moving pen-holder is brought to a designated store-pen-holder where the recording-pen interchange is performed. Therefore, the demerits mentioned in the foregoing paragraph are eliminated in the second group. But, all the heretofore known apparatus of the second group have mechanical structure for holding and releasing of a recording-pen, and naturally have following demerits.

(a) Generally, an elastic force is employed to hold a recording-pen, and the pen must be released by opposing this elastic force for recording-pen interchange. This elastic force is sometimes as strong as 250-300 grams, and it is sometimes difficult to exert such a strong force from the driving mechanism of the moving pen-holder.

(b) A complex machanism is required to perform an interconnected chain of motion in which a recording-pen is released from a hold by a pen-holder with the use of a motion of the moving pen-holder, the released pen is transferred from one pen-holder to the other pen-holder, the pen is gripped by the elastic force of the other pen-holder, and then the moving pen-holder recedes from the position. This complex mechanism connected with the reason described in (a) makes the apparatus bulky and expensive.

(c) To perform the interconnected chain of motion described in (b), the accuracy of the relative position between the moving pen-holder and the mated store-pen-holder must be sufficiently high in the position of recording-pen interchange. This high accuracy requirement brings forth a high production cost. When this accurate relative position is not maintained, not only the performance is not smooth, but also there arises a danger of a breakdown of the mechanism.

(d) Since the apparatus has mechanical construction with high accuracy and required a considerable force, the construction must have sufficient strength and becomes heavy and vulnerable to shock and wear.

Therefore, an object of the present invention is to provide an apparatus for recording-pen interchange which has a very simple structure and requires a very small force for the operation.

Another object of the present invention is to provide an apparatus for recording-pen interchange in which a substantial positioning tolerance is allowed. For example, a positioning error of 1-2 mm shall be allowed between the moving pen-holder and the mated store-pen-holder of this invention.

Still another object of the present invention is to provide an apparatus for recording-pen interchange in which all the pen interchange motions are controlled from a computer and there is no necessity to transmit any signal to any pen-holder.

Still another object of the present invention is to provide an apparatus for recording-pen interchange in which the pen interchange motions are very simple and adapted to be controlled by a computer.

Further object of the present invention is to provide an apparatus for recording-pen interchange which holds a recording-pen with sufficient reliability withstanding to shock and wear.

SUMMARY OF THE INVENTION

In accomplishing these and other objects there has been provided in accordance with the present invention, an automatic recording instrument having an array of store-pen-holders and a moving pen-holder. Each pen-holder of this invention holds a recording-pen with a magnetic clutch. The moving pen-holder has an opening in a first direction, and each store-pen-holder has an opening in a second direction which is perpendicular to the first direction. These openings admit the path of a recording-pen, and therefore, an empty moving pen-holder is not hampered when the moving pen-holder comes from the first direction to a desired pen held in a store-pen-holder, and a loaded moving pen-holder is not hampered when the moving pen-holder comes from the second direction to a desired empty store-pen-holder. At a position where the axis of the moving pen-holder is aligned to the axis of the mated store-pen-holder, both magnetic clutches catches a same recording-pen. When the moving pen-holder recedes from this position in the first direction, the pen is left in the store-pen-holder, and when the moving pen-holder recedes from this position in the second direction, the pen remains in the moving pen-holder. Thus, a smooth recording-pen interchange is completed with a little force.

A better understanding of the present invention may be had when the following specification is read in connection with the accompanying drawings in which:

BRIEF DESCRIPTION OF THE DRAWING

FIG. 1 is a plan view illustrating an embodiment of this invention;

FIGS. 2a-2b show a recording-pen used in an embodiment of this invention;

FIGS. 3a-3b show an array of store-pen-holders used in an embodiment of this invention;

FIGS. 4a-4b show a store-pen-holder holding a recording-pen;

FIGS. 5a-5b show a moving pen-holder used in an embodiment of this invention.

DETAILED DESCRIPTION

Figure 6A:
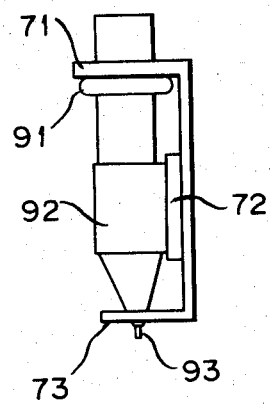
FIGS. 6a-6b show a moving pen-holder holding a recording-pen.

Referring now to FIG. 1, recording-paper 1 is placed on an instrument plane which is framed by a framework 2. X-direction guide rail 3 carries a bracket 4, and Y-direction guide rail 5 extends from the bracket 4 in the Y-direction. A carriage 6 is slidably mounted on the Y-direction guide rail 5. A moving pen-holder 7 is mounted on the carriage 6. An array of store-pen-holders 8 is fixed to the framework 2 at a position within a range attainable by the moving pen-holder 7. In the example shown by FIG. 1, the moving pen-holder 7 and two of the three store-pen-holders 8 hold each one recording-pen 9 respectively, and the remaining store-pen-holder 8 is empty.

X-direction guide rail 3 and Y-direction guide rail 5 are perpendicular to each other in a plane parallel to the surface of the recording-paper 1, and in the following descriptions, rectangular coordinates are assumed in which x- and y-axis are respectively parallel to the guide rails 3 and 5. As the bracket 4 slides on the guide rail 3, and the carriage 6 slides on the guide rail 5, the recording-pen 9 held by the moving pen-holder 7 which is mounted on the carriage 6 can be positioned at any desired point on the surface of the recording-paper 1 to draw a desired trace on the surface.

A driving equipment to move the carriage 6 on the guide rail 5, is housed in the bracket 4, and another driving equipment to move the bracket 4 on the guide rail 3 is installed in the framework 2. These driving equipments, control circuits for controlling these driving equipments, memory means for storing the necessary program and data to generate, in a control computer, control signals to be delivered to the control circuit, and input-output devices for the computer are the same with a heretofore known automatic recording intrument and need no further description. When the moving pen-holder 7 is displaced without drawing a trace on the recording-paper 1 as in the motion for recording-pen interchange, the pen-holder 7 is held in a vertical position receded from the surface of the recording-paper 1 as is well known in a heretofore known automatic drawing instrument.

Figure 6B:
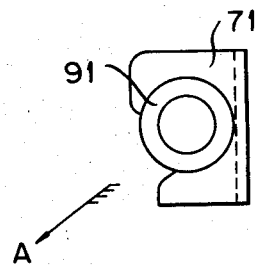

FIG. 2(a), FIG. 3(a), FIG. 4(a), FIG. 5(a), and FIG. 6(a) show elevational views, and FIG. 2(b), FIG. 3(b), FIG. 4(b), FIG. 5(b), and FIG. 6(b) show plan views. In all these drawings, 71 is an upper guide plate of the moving pen-holder 7, 72 is a magnet of the moving pen-holder 7, 73 is a lower guide plate of the moving pen-holder 7, 81 is an upper guide plate of the store-pen-holder 8, 82 is a magnet of the store-pen-holder 8, 83 is a lower guide plate of the store-pen-holder 8, 91 is a collar of the recording-pen 9, 92 is a magnetic member of the recording-pen 9, and 93 is a recording tip of the recording-pen 9.

As shown in FIG. 5(b), the guide plates 71 and 73 have openings in a direction indicated by an arrow A. This direction is called a first direction in this specification and the openings of the guide plates 71 and 73 admit the path of the recording-pen 9 only in the first direction. And as shown in FIG. 3(b), the guide plates 81 and 83 have openings to admit the path of the recording-pen only in the direction indicated by an arrow B. This direction of the arrow B is called a second direction in this specification.

As shown in FIG. 6, when the pen 9 is held by the moving pen-holder 7, the magnetic member 92 adheres to the magnet 72, and the removal of the pen 9 from the moving pen-holder 7 is prevented by guide plates 71 and 73 except in the first direction. Combined force of the weight of the pen 9 and the pressure exerted on the collar 91 from the guide plate 71, presses the tip 93 to the surface of the recording paper 1.

As shown in FIG. 4, when the pen 9 is held by a store-pen-holder 8, the magnetic member 92 adheres to the magnet 82, and the removal of the pen 9 from the store-pen-holder 8 is prevented by guide plates 81 and 83 except in the second direction. The weight of the pen 9 is supported by the upper guide plate 81 on which the collar 91 is placed.

When an instruction is given to place the recording-pen 9 held by the moving pen-holder 7 to a designated empty store-pen-holder 8, the corresponding subroutine program for recording-pen interchange control is started, and the moving pen-holder 7 is first displaced to a point which is on the line of the second direction from the designated store-pen-holder 8. Then the moving pen-holder 7 approaches to the store-pen-holder 8 from the second direction and comes to a point where the axis of the recording-pen 9 coincides with the axis of the store-pen-holder 8. In this approach, the recording-pen passes unobstructedly through the openings of the guide plates 81 and 83. Since the guide plates 71 and 73 of the moving pen-holder 7 and the guide plates 81 and 83 of the store-pen-holder 8 are in different heights, these guide plates do not come to contact in this approach.

At the final destination of this approach, the recording-pen 9 is in a position shown in FIG. 4 when viewed from the store-pen-holder 8, and is in a position shown in FIG. 6 when viewed from the moving pen-holder 7, the magnetic member 92 adhering both to the magnet 72 and to the magnet 82. From this point, the moving pen-holder 7 recedes in the first direction leaving the pen 9 retained by the guide plates 81 and 83 which have no opening in the first direction. Since the openings of the guide plates 71 and 73 are in the first direction, the pen 9 retained in the store-pen-holder 8 do not hamper the motion of the moving pen-holder 7 in the first direction.

It is apparent from the foregoing descriptions that the first and the second directions must be mutually different, and in the embodiment shown by FIG. 4 and FIG. 5, these two directions are perpendicular to each other.

By a similar motion of the moving pen-holder 7, the empty moving pen-holder takes the recording-pen 9 from a designated store-pen-holder. The moving pen-holder 7 is first displaced to a position which is on the line of the first direction from the designated store-pen-holder 8. Then the moving pen-holder 7 approaches to the store-pen-holder 8 from the first direction and comes to a point where the axis of the moving pen-holder 7 coincides with the axis of the store-pen-holder 8. From this point, the moving pen-holder 7 recedes in the second direction holding the recording-pen 9 by the guide plates 71 and 73 which have no openings in the second direction. The recording-pen 9 leaves the store-pen-holder 8 through the openings of the guide plates 81 and 83.

As described in the foregoing paragraphs, when the axis of the moving pen-holder 7 coincides with the axis of a store-pen-holder 8, magnetic forces from the two magnets 72 and 82 are mutually balanced, and a very small external force is sufficient to remove the recording-pen. Even when a small positioning error remains between the two axes because of the tolerance allowed in the assembly, it is easy to obtain an approximate balance between the two magnetic forces. The magnetic force F exerted by a magnet is expressed by an equation $F=KH^2(dR/dx)$, where K is a constant, H is the magnetic flux, R is the magnetic resistance of the magnetic circuit, and x is the gap between the surface of the magnet and the surface facing to the magnet. Since x is small compared with the total length of the magnetic circuit, it is easy to design a magnetic circuit in which the force F remains constant irrespective to a change in X.

In the embodiment shown in FIG. 4 and FIG. 6, the magnets 72 and 82 are placed in symmetry to the axis of the recording-pen 9 in order to obtain an effective balance. But it must be noted that any other positions for the magnets 72 and 82 can be selected within the scope of this invention. Further, the recording-pen 9 can have a magnet and the pen-holders can be provided with magnetic members. Or, the magnets 72 and 82 can be electromagnets, and the forces exerted from these magnets can be electrically controlled. Therefore, it must be understood that, in this specification, the term magnetic clutch includes all the various types of devices for magnetically holding the recording-pen.

In the preferred embodiment described, the first and the second direction are 45 degrees to the x-axis. This means that the motion in these directions can be achieved when the carriage 6 is driven simultaneously in X- and Y-direction with a same speed. The control of such a motion is very simple.

While the described embodiment represents the preferred form of the present invention, it is to be undertood that modifications will occur to those skilled in that art without departing from the spirit of the invention.

I claim:

1. Apparatus for recording-pen interchange comprising:
    (a) carriage means mounted on an automatic recording instrument, said carriage means being movable in a predetermined areal range on a plane parallel to the surface of a recording paper placed in said automatic recording instrument;
    (b) driving means for moving said carriage means;
    (c) a first pen-holder attached to said moving carriage-means, said moving pen-holder having magnetic clutch means for holding a recording-pen to said moving pen-holder and fixed guide plate means for guiding the motion of said recording-pen in a first direction relative to said moving pen-holder to and from the magnetic clutch means;
    (d) a plurality of store-pen-holders, each store-pen-holder being coupled to said automatic recording instrument within said predetermind areal range, and having a second magnetic clutch means for holding a recording-pen to said store-pen-holder and a second fixed guide plate means for guiding the motion of said recording-pen in a second direction relative to said store-pen-holder to and from the second magnetic clutch means; said second direction being different from said first direction;
    (e) memory means for storing program and data to control said driving means; and
    (f) means for starting control operation of said driving means, wherein a designated program is read out from said memory means, the motion of said moving pen-holder is controlled in accordance with said designated program to transfer a recording-pen between said moving pen-holder and a designated store-pen-holder.

2. Apparatus for recording-pen interchange according to claim 1 wherein said guide plate means provided in said moving pen-holder has openings in the first direction substantially allowing said motion of said recording-pen relative to said moving pen-holder only in said first direction, and said second guide plate means provided in said store-pen-holder has openings in the second direction which is different from said first direction, substantially allowing said motion of said recording-pen relative to said store-pen-holder only in said second direction.

3. Apparatus for recording-pen interchange according to claim 2 wherein said first and said second directions are perpendicular to each other.

4. Apparatus for recording-pen interchange comprising:
    (a) carriage means mounted on an automatic recording instrument, said carriage means being movable in a predetermined areal range on a plane parallel to the surface of a recording instrument;
    (b) driving means for changing the position of said carriage means;
    (c) a moving pen-holder attached to said carriage means, said moving pen-holder having magnetic clutch means for holding a recording-pen to said moving pen-holder and guide plate means, said guide plate means having an opening in a first direction allowing the motion of said recording-pen relative to said moving pen-holder only in said first direction;
    (d) a predetermined number of store-pen-holders, each store-pen-holder being fixed to said automatic recording instrument within said predetermined areal range, having magnetic clutch means for holding a recording-pen to said store-pen-holder and guide plate means, said guide plate means having an opening in a second direction which is perpendicular to said first direction and allowing the motion of said recording-pen relative to said store-pen-holder only in said second direction;
    (e) memory means for storing program and data to control said driving means; and
    (f) means for starting control operation of said driving means, wherein designated program is read out from said memory means, the motion of said moving pen-holder is controlled in accordance with said designated program to transfer a recording-pen between said moving pen-holder and a designated store-pen-holder.

5. A recording-pen interchange apparatus for an automatic recording instrument having a recording-pen and recording-paper, the apparatus comprising:
    a moving pen-holder having a first magnetic clutch means for holding the recording-pen to the moving pen-holder and first guide means for guiding the recording-pen in a first direction to and from the first magnetic clutch means;
    carriage means coupled to the automatic recording instrument, for carrying the moving pen-holder;
    driving means for moving the carriage means and moving pen-holder in a predetermind areal range in a plane parallel to the surface of the recording-paper placed in the automatic recording instrument;

at least one store-pen-holder having a second magnetic clutch means for holding the recording pen to the store-pen-holder and a second guide means for guiding the recording-pen to and from the second magnetic clutch means in a second direction different from the first direction;

wherein the recording-pen may be transferred from the moving pen-holder to the store-pen-holder by moving the pen held within the moving pen-holder in the second direction to place the pen within the second magnetic clutch means and withdrawing the moving pen-holder in the first direction thereby leaving the recording-pen held by the store-pen-holder and wherein the recording-pen may be transferred from the store-pen-holder to the moving pen-holder by moving the moving-pen-holder in the first direction to place the pen within the first magnetic clutch means and withdraw the moving pen-holder in the second direction thereby removing the recording-pen from the store-pen-holder.

6. The apparatus of claim 5 wherein the first guide means comprises a rigid, fixed horizontal guide plate having an opening in the first direction, and the second guide means comprises a second rigid, fixed horizontal guide plate having an opening in the second direction, said guide plates being on different vertical levels so as to avoid interfering with each other when transferring the pen.

7. The apparatus of claim 5 wherein the recording-pen has a projection which rests on the moving pen-holder guide means thereby supporting the recording-pen when held by the first magnetic means.

8. The apparatus of claim 5 wherein the first and second magnetic clutch means are arranged to approximately balance each other when the recording-pen is transferred between the moving pen-holder and the store-pen holder.

9. The apparatus of claim 5 wherein the first and second magnetic clutch means are arranged to hold the recording-pen on substantially diametrically opposed sides of the recording-pen wherein the magnetic forces exerted by the first and second magnetic clutch means are substantially balanced when the pen is transferred between the moving pen-holder and the store-pen-holder.

10. The apparatus of claim 5 wherein the moving pen-holder guide means further has means for restraining the recording-pen from motion in each horizontal direction except the first direction when the pen is held by the first magnetic clutch means thereby providing additional support for the recording-pen.

11. A pen interchange apparatus comprising:
a relatively movable pen-holder with a pen entrance-egress slot angled in a first direction;
a relatively stationary pen-holder with a pen entrance-egress slot angled at a second direction that is angled with respect to said first direction; and
control means for moving said movable pen-holder in a first movement toward and into pen transfer contact with said stationary pen-holder from a direction in alignment with only one of said entrance-egress slots so that the pen is captured by both the movable and the stationary pen-holders, and for thereafter moving the movable pen-holder in a second movement away in a direction generally in alignment only with the other of said entrance-egress slots so that the pen is released by one of the moveble pen-holder and the stationary pen-holder, wherein transfer of the pen between the movable pen-holder and the stationary pen-holder is completed after only the first and second movements.

12. A pen interchange apparatus comprising:
a relatively moveable pen-holder having a first magnetic clutch means for holding a pen;
a relatively stationary pen-holder having a second magnetic clutch means for holding the pen; and
transfer means for moving said moveable pen-holder toward and into pen transfer contact with said stationary pen-holder, for transferring the pen from one pen-holder to the other pen-holder, and for moving said moveable pen-holder from said pen transfer contact;
said first and second magnetic clutch means being arranged to substantially balance each other when in pen transfer contact wherein a relatively weak force is required to remove the pen from one of the magnetic clutch means during a pen transfer.

13. The pen interchange apparatus of claim 11 wherein the pen entrance-egress slot of each pen-holder is rigid.

14. A pen interchange apparatus comprising:
a relatively movable pen-holder with a pen entrance-egress slot angled in a first direction;
a relatively stationary pen-holder with a pen entrance-egress slot angled at a second direction that is angled with respect to said first direction; and
control means for moving said movable pen-holder in a V-shaped pen interchange pattern, said control means first moving the pen-holder toward and into pen transfer contact with said stationary pen-holder from a direction in alignment with only one of said entrance-egress slots and for thereafter moving the movable pen-holder away in a direction generally in alignment only with the other of said entrance-egress slots.

15. In a drawing machine in which a pen is separately and concurrently positionable along guide rails, one of which is parallel to an x-axis and another of which is parallel to a y-axis orthogonal to the x-axis, said x and y axes in a plane, a pen interchange apparatus comprising:
a moving pen-holder having a pen entrance-egress slot angled in a first direction oblique to the x and y axes;
a relatively stationary pen-holder with a pen entrance-egress slot angled at a second direction that is angled with respect to said first direction and is oblique to the x and y axes; and
control means for moving said movable pen-holder toward and into pen transfer contact with said stationary pen-holder from a direction in alignment with only one of said entrance-egress slots and for thereafter moving the movable pen-holder away in a direction generally in alignment only with the other said of entrance-egress slots.

16. A pen interchange apparatus for an automatic drafting machine having a drafting surface which defines a plane, comprising:
a relatively movable pen-holder having a plate parallel to the drafting plane, wherein said plate has a pen entrance-egress slot angled in a first direction;
relatively stationary pen-holder having a plate parallel to the drafting plane and non-coplanar with the movable pen-holder plate, wherein said stationary pen-holder plate has a pen entrance-egress slot angled at a second direction that is angled with respect to said first direction; and control means for moving said movable pen-holder toward and into pen transfer contact with said stationary pen-holder from a direction in alignment with only one of said entrance-egress slots and for thereafter moving the movable pen-holder away in a direction generally in alignment only with the other of said entrance-egress slots.

* * * * *